United States Patent
Wylie

(10) Patent No.: US 12,534,053 B2
(45) Date of Patent: Jan. 27, 2026

(54) BRAKE SYSTEM AND METHOD FOR BRAKING A VEHICLE

(71) Applicant: Astemo Netherlands B.V., Zaltbommel (NL)

(72) Inventor: Paul Wylie, Zaltbommel (NL)

(73) Assignee: Astemo Netherlands B.V., Zaltbommel (NL)

( * ) Notice: Subject to any disclaimer, the term of this patent is extended or adjusted under 35 U.S.C. 154(b) by 98 days.

(21) Appl. No.: 18/259,628

(22) PCT Filed: Dec. 27, 2021

(86) PCT No.: PCT/NL2021/050790
§ 371 (c)(1),
(2) Date: Jun. 28, 2023

(87) PCT Pub. No.: WO2022/146140
PCT Pub. Date: Jul. 7, 2022

(65) Prior Publication Data
US 2024/0067146 A1  Feb. 29, 2024

(30) Foreign Application Priority Data
Dec. 28, 2020  (EP) .................................... 20217442

(51) Int. Cl.
*B60T 8/92* (2006.01)
*B60T 8/32* (2006.01)
(Continued)

(52) U.S. Cl.
CPC .............. *B60T 8/92* (2013.01); *B60T 8/3215* (2013.01); *B60T 8/885* (2013.01); *B60T 17/22* (2013.01);
(Continued)

(58) Field of Classification Search
CPC .......... B60T 8/92; B60T 8/3215; B60T 8/885; B60T 17/22; B60T 2220/04;
(Continued)

(56) References Cited

U.S. PATENT DOCUMENTS

| 10,661,764 B1* | 5/2020 | Katzourakis ............ B60T 8/172 |
| 2022/0097528 A1* | 3/2022 | Crombez ................ F16D 61/00 |

FOREIGN PATENT DOCUMENTS

| EP | 1 616 746 A2 | 1/2006 |
| GB | 2472392 A | 2/2011 |

OTHER PUBLICATIONS

International Search Report issued in PCT/NL2021/050790; mailed Mar. 28, 2022.
(Continued)

*Primary Examiner* — Yi-Kai Wang
(74) *Attorney, Agent, or Firm* — Studebaker Brackett PLLC

(57) ABSTRACT

A brake system (1) for braking a vehicle is disclosed. The brake system comprises a brake pedal control unit (4a1) configured to receive a brake pedal signal from a brake pedal sensor (21) and to respond with a primary deceleration intent signal onto a network, a brake actuator control unit (4b1) configured to activate a brake actuator (31) in response to a deceleration intent signal received from the network. The brake system (1) further comprises a central vehicle control unit (VCU) (6) that is configured to generate a secondary deceleration intent signal in response to the primary deceleration intent signal based on an overall state of the vehicle and a mode control unit (MCU) (8) to configure the brake system in an operational mode selected from at least a normal operational mode (N) and a degraded operational mode (D). The brake actuator control unit (4b1) is configured to activate the brake actuator (31) in response to a secondary deceleration intent signal in the normal opera-
(Continued)

tional mode and to activate the brake actuator (31) in response to the primary deceleration intent signal in the degraded operational mode (D) for applying degraded (emergency) braking to the vehicle.

20 Claims, 10 Drawing Sheets

(51) Int. Cl.
 *B60T 8/88* (2006.01)
 *B60T 17/22* (2006.01)
(52) U.S. Cl.
 CPC ....... *B60T 2220/04* (2013.01); *B60T 2250/00* (2013.01); *B60T 2270/60* (2013.01); *B60T 2270/82* (2013.01)
(58) Field of Classification Search
 CPC ............. B60T 2250/00; B60T 2270/60; B60T 2270/82; B60T 8/96; B60T 2270/404; B60T 2270/413
 USPC .......................................................... 701/70
 See application file for complete search history.

(56) References Cited

OTHER PUBLICATIONS

Written Opinion of the International Searching Authority issued in PCT/NL2021/050790; mailed Mar. 28, 2022.

\* cited by examiner

BRAKE SYSTEM AND METHOD FOR BRAKING A VEHICLE

TECHNICAL FIELD AND BACKGROUND

The present disclosure relates to an electric brake system, method of controlling the system, controller or software for such system, and vehicle comprising the brake system.

Brake-by-wire is typically used to denote a braking system in which the actuation and transmission devices are decoupled from each other. In a conventional hydraulic brake system, the brake pedal is the actuator and the hydraulic is the transmission device. Here, a distinction is made between the electrohydraulic brake, electro-pneumatic brake (in trucks) and the electric brake. Only the omission of the hydraulic or pneumatic makes the brake a real, so-called "dry" brake-by-wire application, since no fluid technology systems are used here. One reason for wanting to use this technology may be the slowness of currently used media in a brake system. With the help of pure electromechanical solutions, shorter response times may be achieved, which may also be reflected in the achievable braking distances. Another advantage may be a more favorable manufacturability of the brake-by-wire technology, since components in use in hydraulic systems such as a master cylinder, brake booster and an anti-lock component or more generally a brake modulation component are expensive to make, in comparison. Electromechanical solutions further avoid a risk of Pollution by brake fluid associated with vehicles having a hydraulic brake system, which is especially a concern at the end of the vehicle life. Furthermore electromechanical solutions facilitate easier vehicle assembly.

An electric vehicle brake typically has an electromechanical actuation device, configured to press a friction brake lining for braking against a brake body that is mounted to a vehicle wheel. The brake body is typically a brake disc or a brake drum. The actuation device typically has an electric motor and a rotation-to-translation conversion gear that converts a rotary driving motion of the electric motor into a translational motion for pressing the friction brake lining against the brake body. Worm gears, such as spindle gears or roller worm drives, are often used as rotation-to-translation conversion gears. It is also possible to convert the rotary motion into a translational motion by means of a pivotable cam, for instance. A step-down gear, for instance in the form of a planetary gear, is often placed between the electric motor and the rotation-to-translation conversion gear. Self-boosting electromechanical vehicle brakes have a self booster that converts a frictional force, exerted by the rotating brake body against the friction brake lining that is pressed for braking against the brake body, into a contact pressure, which presses the friction brake lining against the brake body in addition to a contact pressure that is exerted by the actuation device. Wedge, ramp, and lever mechanisms are suitable for the self boosting.

An electric vehicle brake is controlled by an electronic control unit (ECU) which is responsive to an external brake control signal which is generated in response to a driver action, e.g. pressing a brake pedal, or generated autonomously upon detection of an obstacle by a radar system. More and more vehicle functionalities like braking are electronically controlled. For example, a state of the art premium type car may contain over a hundred electronic control units (ECUs) that each are responsible for a particular function like steering, engine power control, braking, environment monitoring, climate control and the like. Typically, an ECU does no not operate autonomously, but operates in cooperation with other ECU's. For example an ECU for braking control cooperates with an ECU for steering control and an ECU for engine power control for optimal vehicle stability. This complicates their innovation, because any modification of an ECU may necessitate modification of other ECUs cooperating therewith. Mutually mismatching modifications of ECUs may jeopardize vehicle safety. This implies in particular to aspects of a vehicle control system that are associated with the electronic brake system. Accordingly, there is a need to facilitate development of electronic vehicle control functions while mitigating safety risks.

SUMMARY

Aspects of the present invention relate to an improved brake system for braking a vehicle. The improved brake system comprises a set of sensors configured to detect a respective state of the vehicle, a set of actuators configured to operate a respective state of the vehicle, a set of engine control units (ECU) operably connected to the sensors and actuators, a central vehicle control unit (VCU), a network interconnecting the engine control units (ECU) and the central vehicle control unit (VCU, and a mode control unit (MCU) to select an operational mode of the brake system. The interconnecting network enables the control units to exchange signals in the form of messages for example using an ethernet protocol. Exemplary messages include one or more of an identification of the transmitting control unit, a timestamp, a function of the message, a target range, such as a specific destination control unit, a group of destination control units or all control units interconnected by the network. In some examples the MCU is also interconnected with the other control units in the network to control their operation in accordance with the selected operational mode. In other examples separate communication the MCU is configured with separate communication lines to other control units for that purpose.

The set of sensors comprises a brake pedal sensor that is operably connected to a brake pedal and that is configured to send a brake pedal signal when the brake pedal is actuated.

The set of actuators comprises a brake actuator that is configured to apply braking to the vehicle when it receives a brake actuating signal.

The set of engine control units comprise a brake pedal control unit and a brake actuator control unit. The brake pedal control unit is configured to receive the brake pedal signal from the brake pedal sensor and to send a primary deceleration intent signal onto the network, and the brake actuator control unit is configured to activate the brake actuator based on a deceleration intent signal received from the network.

The central vehicle control unit VCU is configured to receive, process, and send signals for centrally controlling the vehicle. This includes centrally controlling braking of the vehicle with a secondary deceleration intent signal based on the primary deceleration intent signal received from the brake pedal control unit and further based on an overall state of the vehicle.

The mode control unit (MCU) is provided to configure the brake system in an operational mode selected from at least a normal operational mode and a degraded operational mode.

In the normal operational mode the brake actuator control unit is configured to activate the brake actuator in response to a secondary deceleration intent signal that is generated by the central vehicle control unit in response to the primary deceleration intent signal based on an overall state of the vehicle.

In the degraded operational mode the brake actuator control unit is configured to activate the brake actuator in response to the primary deceleration intent signal for applying degraded (emergency) braking to the vehicle.

In the normal operational mode the central vehicle control unit is configured to generate the secondary deceleration intent signal in response to the primary deceleration intent signal based on an overall state of the vehicle, and the brake actuator control unit is configured to activate the brake actuator in response thereto. Therewith the central vehicle control unit is configured to modify the effect of the primary deceleration intent signal on the brake actuator dependent on circumstances such as the current speed of the vehicle, information about the state of the road, information about the orientation of the wheels and the like, for example to contribute to vehicle stability. In an exceptional case that the VCU is not capable to generate a secondary deceleration intent signal or that the secondary deceleration intent signal is not reliable, the mode control unit (MCU) configures the brake system in the degraded operational mode, so that the driver is still capable to control the brake actuator.

In an embodiment of the brake system the mode control unit comprises a diagnostic module to perform a diagnosis of the central vehicle control unit and to select the degraded operational mode if it detects a malfunctioning of the central vehicle control unit. Alternatively or additionally, the VCU has an auto-diagnostic functionality. For example, in one embodiment the VCU comprises two or more VCU modules that independently perform the same computation. In case of a discrepancy between the computation results from the VCU modules is detected, it is determined that at least one of the VCU modules is malfunctioning. In case a same computation is performed by more than two VCO modules, it can also be determined which of the two VCO modules is malfunctioning. In another example the two or more VCO modules perform mutually different steps of the computation of the secondary deceleration intent signal. In that case the detection can be performed by a watchdog procedure.

Various options are available to allow the mode control unit to control the operational mode of the brake system. In some embodiments the brake system further comprises a set of vehicle interface units (VIU) forming respective gateways in the network configured to route signals between the engine control units (ECU) and the central vehicle control unit (VCU). In the normal operational mode the mode control unit configures the vehicle interface units (VIU) to route the primary deceleration intent signal from the brake pedal control unit to the central vehicle control unit and to route the secondary deceleration intent signal from the central vehicle control unit to the brake actuator control unit. In the degraded operational mode, the mode control unit in these embodiments configures the vehicle interface units (VIU) to route the primary deceleration intent signal from the brake pedal control unit to the brake actuator control unit.

In other embodiments the mode control unit is configured to instruct the brake actuator control unit to select as the deceleration intent signal the secondary deceleration intent signal and the primary deceleration intent signal in the normal operational mode and in the degraded operational mode respectively. In some examples of these other embodiments the brake actuator control unit is configured to autonomously respond to the primary deceleration intent signal if it has not received a secondary deceleration intent signal within a predetermined time interval after it has received a primary deceleration intent signal. To that end a message conveying the primary deceleration intent signal can comprise an identification to distinguish it from earlier transmitted primary deceleration intent signals and a message conveying the secondary deceleration intent signal can comprise information that it is a response to the primary deceleration intent signal with that identification. Therewith the BCU is capable to detect that a secondary deceleration intent signal to be used for controlling the brake actuator was timely received or to use the primary deceleration intent signal otherwise. In comparison to the some embodiments previously mentioned these embodiments are advantageous in that the mode control unit can directly control the brake actuator control unit to operate in accordance with the selected operational mode. In example of these other embodiments a control line from the mode control unit to the brake actuator control unit is hardwired for optimal reliability. An advantage of the some embodiments previously mentioned is that it is avoided that the network needs to transmit unused signals. For example in the normal operational mode the network does not need to transmit the primary deceleration intent signal from the brake pedal control unit to the brake actuator control unit. Also in the degraded operational mode the network does not need to transmit the primary deceleration intent signal from the brake pedal control unit to the central vehicle control unit and to transmit the secondary vehicle control signal from the central vehicle control unit to the brake actuator control unit.

In exemplary embodiments the mode control unit is configured to provide for a transition from the degraded operational mode to a further, non-operational mode if a predetermined time interval has lapsed or if the vehicle has driven more than a predetermined distance since the degraded operational mode was selected. This enables the driver to drive the vehicle to a garage, but prevents that the driver continues to use the vehicle as if no failure had occurred at all.

In some embodiments the brake system comprises engine control units (ECU) other than the brake actuator control unit. In normal operation, the VCU is configured to send other signals to these other ECUs based on the primary deceleration intent signal received from the brake pedal control unit to increase vehicle stability. In one example thereof the brake system comprises a steering ECU and the VCU is configured to coordinate steering and braking through respective control signals to the steering ECU and the braking ECU. In another example thereof the brake system comprises a power train ECU and the VCU is configured to coordinate engine control and braking through respective control signals to the power train ECU and the braking ECU. For example in case the primary deceleration intent signal indicates an intent of a modest deceleration it causes the power train ECU to reduce vehicle speed by reducing a level of power supplied to the engine or by causing the engine to brake by regenerating power. In case the primary deceleration intent signal indicates an intent of a strong deceleration it causes the power train ECU to reduce vehicle speed by causing the engine to brake by regenerating power and additionally causes the braking ECU to enforce the brake actuator.

It will be appreciated that many other extensions of the brake system are conceivable. For example two or more other ECUs, for example including the power train ECU and the braking ECU are included in the brake system. In some embodiments a control unit is one of a plurality of control units to provide for redundancy. For example the MCU is one of a pair of MCU's or a BCU is one of a set of BCU's. For example in a vehicle, each wheel is provided with a proper BCU. In some examples a control unit is composed of a plurality of control modules that perform mutually different functions or that perform a same function for the sake of redundancy. In examples thereof modules of a control unit verify each others operation for diagnostic purposes. In some examples modules of mutually different control units are implemented by a common computation unit. For example a first common computation unit implements modules of a brake control unit and a steering control unit and a second common computation unit redundantly implements those modules of the brake control unit and the steering control unit. Therewith a redundant implementation of essential functions is realized with a modest amount of hardware.

In some embodiments the mode control unit comprise a signaling module that warns the driver in case that the mode control unit selects the degenerated operational mode. Therewith the driver can change a driving behavior to take into account that the vehicle responds differently. As a further safety measure some embodiments provide for a limitation in the maximum speed in the degraded operational mode. This measure does not require advanced signal processing functions of a VCU, but can be implemented with basic logic elements.

As noted, in some embodiments the VCU may include a plurality of VCU modules and it may occur that it is determined that one thereof is malfunctioning, but at least another one is still healthy. In examples of these embodiments the mode control unit selects an additional, temporary operational mode. In the temporary operational mode the VCU is still enabled to control the brake actuator control unit, but the driver is informed that maintenance is required and/or the maximum speed of the vehicle is limited. If it is detected that the VCU is fully dysfunctional either in the temporary operational mode or in the normal operational mode the mode control unit selects the degraded operational mode. Also, in examples of these embodiments if it is detected that a maintenance did not take place within a predetermined time-interval or a maximum driving distance was exceeded since the mode control unit selected the temporary operational mode or the degraded operational mode, the mode control unit selects the non-operational mode. In some of these examples, the mode control is capable to select a transitional mode, as a transition from the temporary operational mode or the degraded operational mode to the non-operational mode wherein the driving power is gradually reduced to 0.

BRIEF DESCRIPTION OF THE DRAWINGS

These and other features, aspects, and advantages of the apparatus, systems and methods of the present disclosure will become better understood from the following description, appended claims, and accompanying drawing wherein:

FIGS. 3A and 3B show subsequent stages in a normal operational mode and FIG. 3C shows a degraded operational mode;

DETAILED DESCRIPTION OF EMBODIMENTS

Figure 1A:
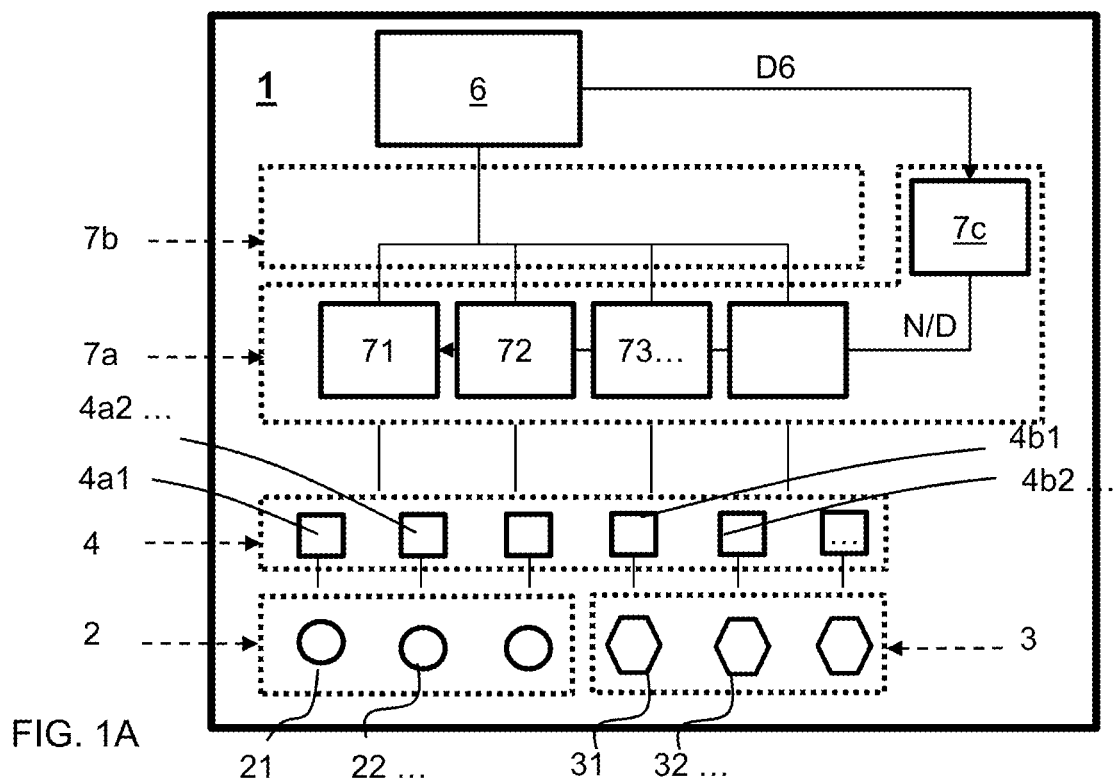
FIG. 1A, 1B schematically show embodiments of a brake system for braking a vehicle

Terminology used for describing particular embodiments is not intended to be limiting of the invention. As used herein, the singular forms "a", "an" and "the" are intended to include the plural forms as well, unless the context clearly indicates otherwise. The term "and/or" includes any and all combinations of one or more of the associated listed items. It will be understood that the terms "comprises" and/or "comprising" specify the presence of stated features but do not preclude the presence or addition of one or more other features. It will be further understood that when a particular step of a method is referred to as subsequent to another step, it can directly follow said other step or one or more intermediate steps may be carried out before carrying out the particular step, unless specified otherwise. Likewise it will be understood that when a connection between structures or components is described, this connection may be established directly or through intermediate structures or components unless specified otherwise.

The invention is described more fully hereinafter with reference to the accompanying drawings, in which embodiments of the invention are shown. In the drawings, the absolute and relative sizes of systems, components, modules, and units may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

FIG. 1A schematically shows an embodiment of a brake system 1 for braking a vehicle. The brake system 1 shown therein comprises a set 2 of sensors configured to detect a respective state of the vehicle, a set 3 of actuators configured to operate a respective state of the vehicle, a set 4 of engine control units (further denoted as ECU) operably connected to the sensors and actuators, a central vehicle control unit 6 (further denoted as VCU), and a set 7a of vehicle interface units (further denoted as VIU). The VIUs 71, 72, . . . form respective gateways in a network 7b that interconnects the ECUs, 4a1, 4a2, . . . , 4b1, 4b2, . . . and the VCU 6.

The set 2 of sensors comprise a brake pedal sensor 21 that is operably connected to a brake pedal and that is configured to send a brake pedal signal BPS when the brake pedal is actuated. Whereas a single brake pedal sensor 21 is shown, typical embodiments comprise a redundant brake pedal sensor so that a brake pedal is sent even if one of the brake pedal sensors is non-functioning. The embodiment of the brake system 1 comprises further sensors, such as a parking button sensor 25 that is operably connected to a parking button and that is configured to send a parking button signal when the parking button is actuated. Further examples are a steering wheel sensor that is operably connected to a steering wheel and that is configured to send a steering wheel signal indicative for a rotational state of the steering wheel, a gas pedal sensor that is operably connected to a gas pedal and that is configured to send a power signal indicative for an intended speed or acceleration corresponding to an orientation of the gas pedal and a gear selection sensor that is operably connected to a gear selection arm and that is configured to send a gear selection signal indicative for an intended gear selection corresponding to an orientation of the gear selection arm.

The set 3 of actuators comprise a brake actuator 31 that is configured to apply braking to the vehicle when receiving a brake actuating signal. Typically the brake actuator 31 is one of a plurality of brake actuators each configured to act on a respective wheel of the vehicle. In the embodiment of FIG. 1A further actuators are provided. One thereof is a steering actuator 32 that is configured to control the orientation of one or more wheels of the vehicle when receiving a steering actuation signal. In some embodiments the vehicle is a car and the steering actuator 32 controls the orientation of both front wheels. In other embodiments the steering actuator 32 is one of a first and a second steering actuators that respectively control an orientation of the left and the right front wheel. Also one or more steering actuators may be provided to control an orientation of the back wheels. The engine driving the vehicle is a further example of an actuator.

As shown in FIG. 1A, the set 4 of ECUs comprises a brake pedal control unit 4a1 that is configured to receive the brake pedal signal from the brake pedal sensor 21 and to send a primary deceleration intent signal onto the network 5 in response to the brake pedal signal. The set 4 of ECUs also comprises a brake actuator control unit 4b1 that is configured to activate the brake actuator 31 based on a deceleration intent signal received from the network 5. In the embodiment shown further ECUs are provided. As one example an ECU 4a2 is configured to receive the steering wheel signal from the steering wheel sensor 22 and to send a primary steering intent signal onto the network 5 in response to the steering wheel signal. As another example it comprises a steering actuator control unit 4b2 is configured to activate the steering actuator 32 based on a steering intent signal received from the network 5.

As noted, the VCU 6 is configured to receive, process, and send signals for centrally controlling the vehicle. This centrally controlling includes centrally controlling braking of the vehicle based on the primary deceleration intent signal PDI received from the brake pedal control unit 4a1 and further based on an overall state of the vehicle. In embodiments the VCU 6 is configured to determine the overall state of the vehicle using signals received from one or more sensors in the set of sensors other than the brake pedal sensor 21. In one example the VCU receives a wheel orientation signal indicative for a current orientation of front wheels of the vehicle and if necessary provides a secondary deceleration intent signal different from the primary deceleration intent signal to avoid vehicle instability. Alternatively or additionally, in another example the VCU receives a vehicle speed signal from a vehicle speed sensor indicative for a current speed of the vehicle and accordingly provides a secondary deceleration intent signal SDI to optimize vehicle stability. Alternatively or additionally, in some embodiments the VCU 6 is configured to determine an overall state of the vehicle using input signals from control units other than the brake pedal control unit.

As noted, the set 7a of VIUs 71, 72, . . . form respective gateways in a network 7b that interconnects the ECUs 4a1, 4a2, . . . , 4b1, 4b2, . . . and the VCU 6. In preferred embodiments the interconnections provided by the VIUs are redundant, so that even in the exceptional case of a malfunctioning of a proper transmission of signals between the ECUs 4a1, 4a2, . . . , 4b1, 4b2, . . . and the VCU 6 is safeguarded. The set 7a of VIUs 71, 72, . . . is further configured to selectively route signals between the ECUs and the VCU dependent on an operational mode, which is selected from one or more of a normal operational mode (N) and a degraded operational mode (D). In the embodiment shown in FIG. 1A, a mode control unit 7c is provided in cooperation with the set of 7a of VIUs, that selects the operational mode. The default selection is the normal operational mode (N). However, if the mode control unit 7c has an indication that the VCU 6 does not operate properly, it selects the degraded operational mode. In this case it is responsive to an auto-diagnostic signal D6 from the VCU 6. As mentioned above various configurations are possible for a VCU capable of performing auto-diagnostics.

Figure 1B:
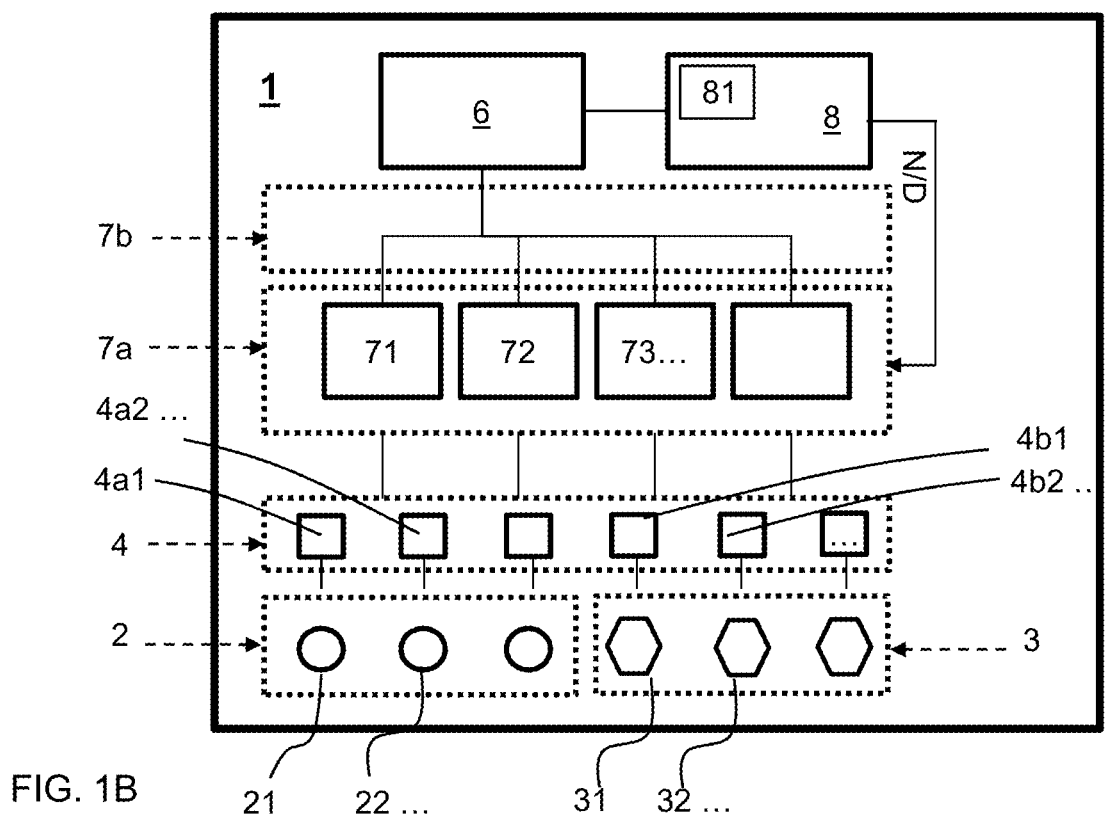

FIG. 1B shows an alternative embodiment, wherein a mode control unit 8 is provided with a diagnostic module 81. In this case it is not necessary that the VCU 6 has auto-diagnostic facilities, but these may be provided as a further safety measure. In some examples the diagnostic module 81 of the mode control unit 8 performs a watchdog procedure wherein it monitors VCU 6 responses.

Figure 2A:
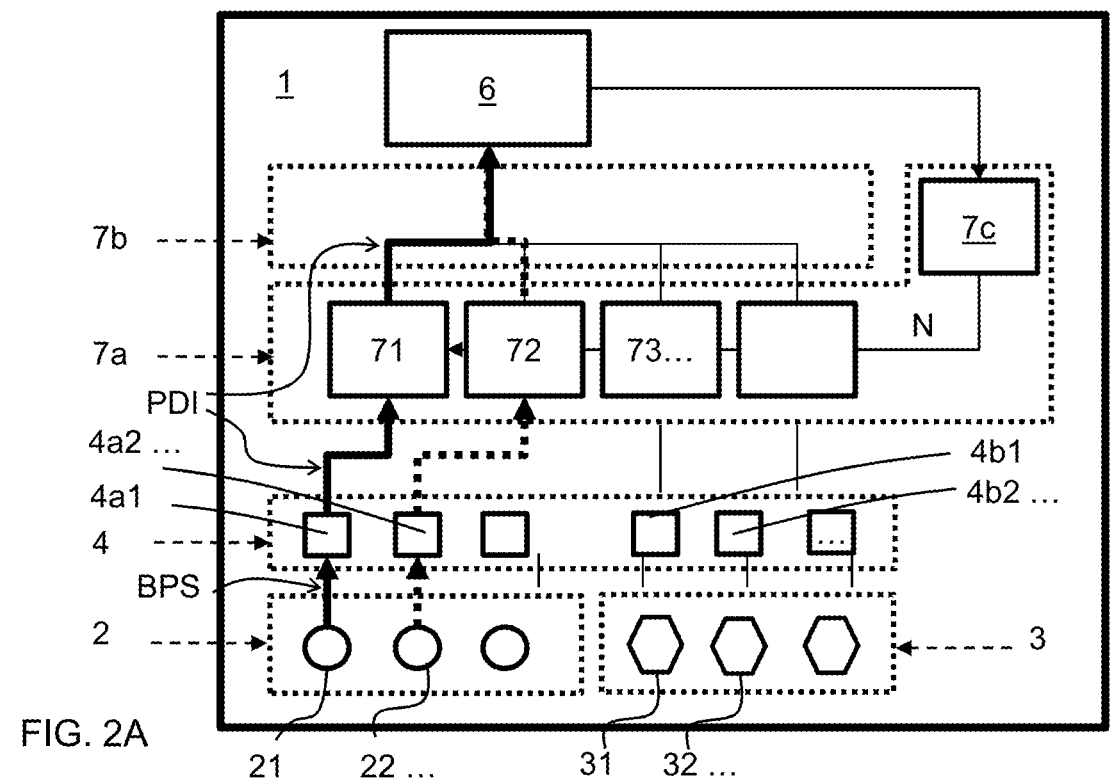
FIGS. 2A and 2B show subsequent stages in a normal operational mode of the brake system of FIG. 1A.
Figure 2B:
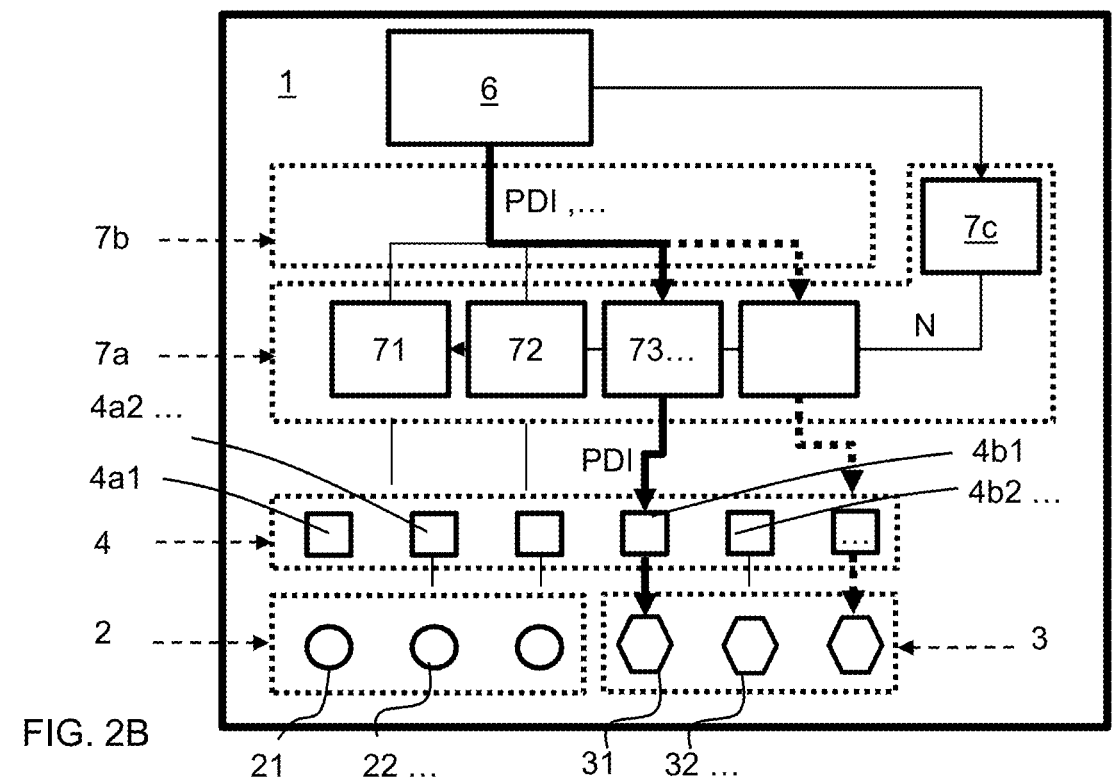

Subsequent stages in a normal operational mode (N) of the brake system of FIG. 1A are illustrated in FIGS. 2A and 2B. In the example shown in FIG. 2A, the brake pedal is actuated and the brake pedal sensor 21 operably connected thereto sends a brake pedal signal BPS. The brake pedal control unit 4a1 responds to the brake pedal signal BPS by sending a primary deceleration intent signal PDI onto the network 7b via the gateway 71. This primary deceleration intent signal PDI is received by the VCU 6. The VCU in addition may receive further intent signals as indicated by the dotted path. Examples of further intent signals are yaw intent signal indicative for an intended change of vehicle direction generated in response to an actuation of a steering wheel. The VCU 6 is also configured to receive sensor signals, of which some may be relevant for a stable, safe and comfortable control. Examples of other sensor signals are wheel speed sensor signals, vehicle movement signals indicative of rotational movements and the like. In normal operation (N) the VCU 6 receives and processes the various signals for centrally controlling the vehicle. This also includes that the VCU 6 computes a secondary deceleration intent signal SDI in response to the primary deceleration intent signal PDI taking into account the overall state of the vehicle as indicated by the signals it received. In the normal operational mode (N) the brake actuator control unit 4b1 is configured to activate the brake actuator 31 in response to the secondary deceleration intent signal SDI computed by the VCU 6 in response to the primary deceleration intent signal PDI. This is illustrated in FIG. 2B. It is noted that in normal circumstances, the VCU 6 will send the secondary deceleration intent signal SDI virtually directly upon receipt of the primary deceleration intent signal PDI, for example with less than a ms, preferably within less than 100 microseconds, even more preferably within less than 10 microseconds, and still more preferably within 1 microsecond. As shown in FIG. 2B, the secondary deceleration intent signal SDI is transmitted via gateway 73 of the network to the brake actuator control unit 4b1, which in response thereto appropriately activates the brake actuator 31. As further indicated by dotted lines in FIG. 2B, the VCU 6 is further configured to send secondary signals. Examples thereof a secondary steering intent signals, a suspension control signal to control a stiffness of suspension and the like.

Figure 2C:
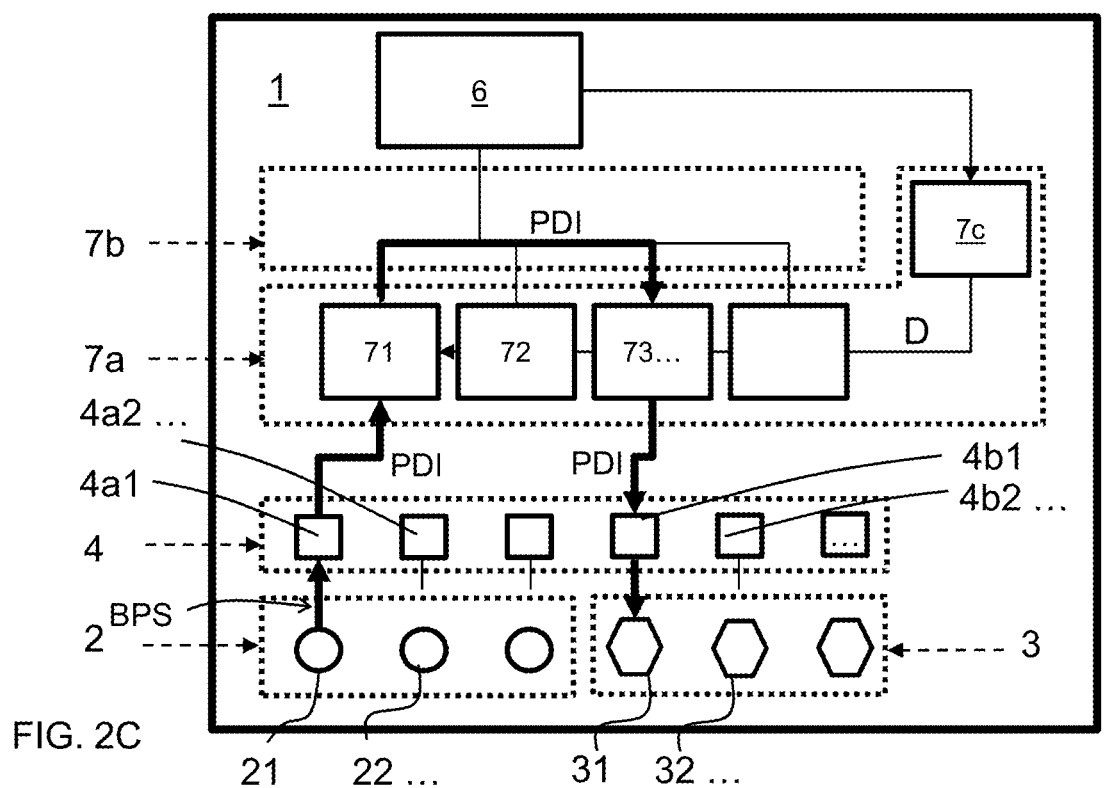
FIG. 2C shows operation of the brake system of FIG. 1A in a degraded operational mode.

FIG. 2C shows the exceptional case that the mode control unit 7c has selected the degraded operational mode (D). Similar to the example shown in FIG. 2A, 2B, the brake pedal control unit 4a1 responds to a brake pedal signal BPS by sending a primary deceleration intent signal PDI onto the network 7b via the gateway 71. Contrary to the situation in the normal operational mode, the primary deceleration intent signal PDI is now transmitted via the network 7b via the gateway 73 to the brake actuator control unit 4b1 instead of a secondary deceleration intent signal SDI. Therewith even in the exceptional case of a malfunctioning of the VCU 6 a river is still enabled to control the braking actuator 31.

It is noted that the description presented above for FIG. 2A, 2B, 2C, applies equally for the embodiment of FIG. 1B provided with a separate mode control unit 8.

Figure 3A:
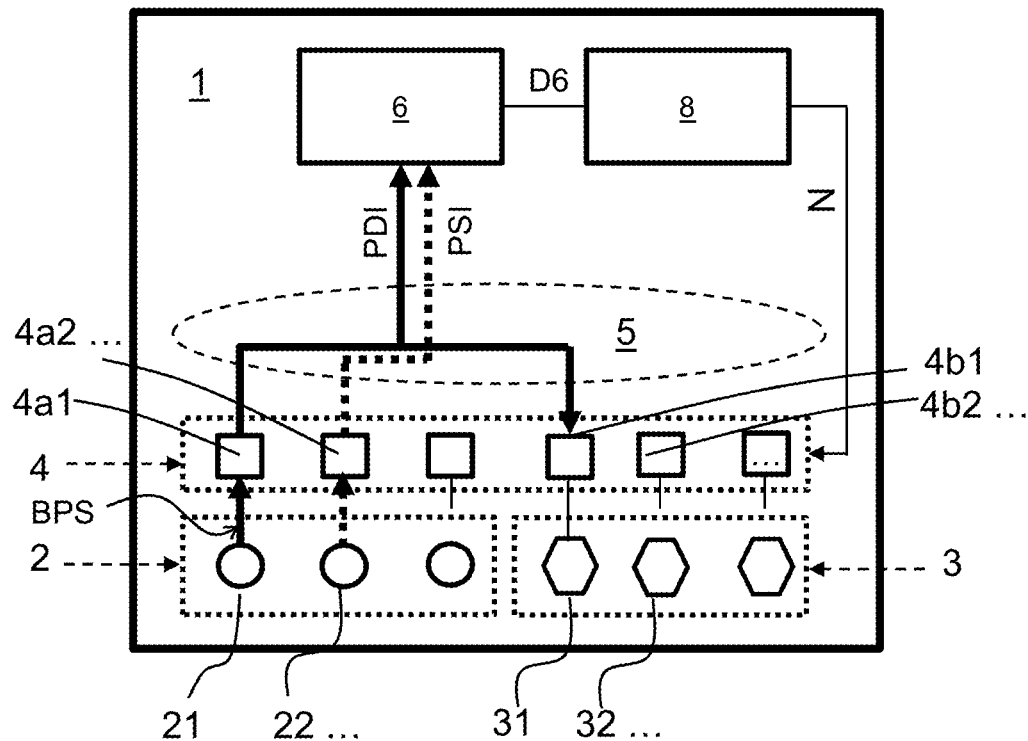
FIG. 3A, 3B, 3C illustrate a further embodiment of a brake system, Therein
Figure 3B:
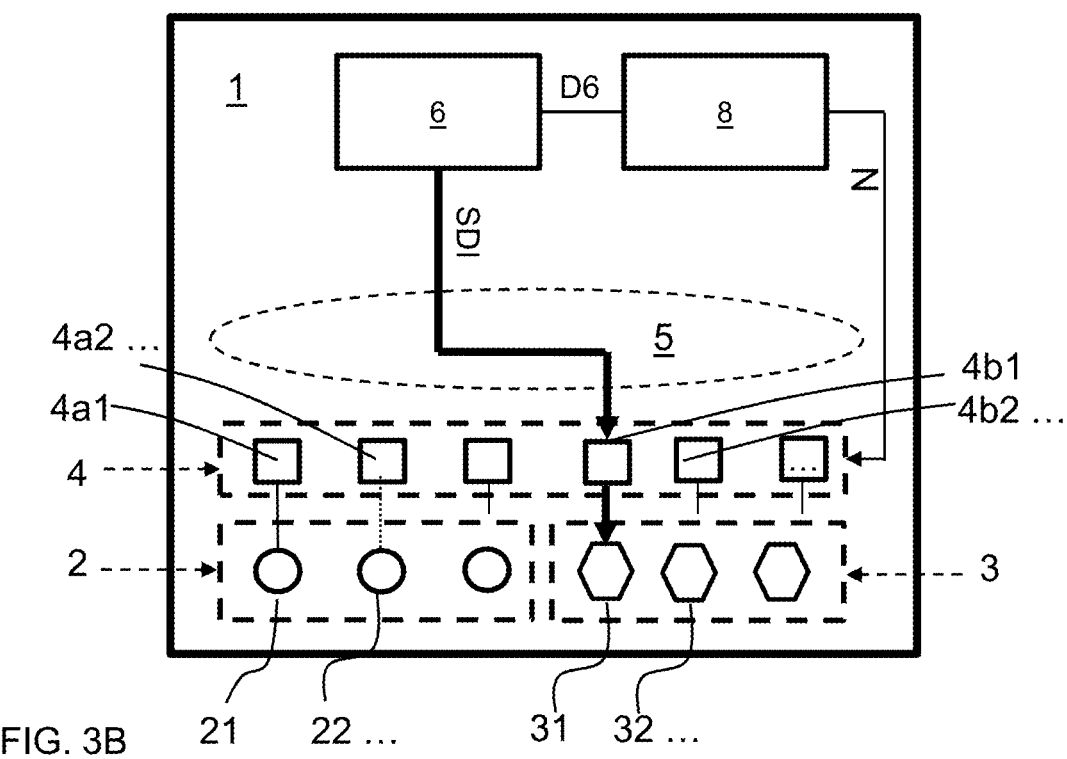
Figure 3C:
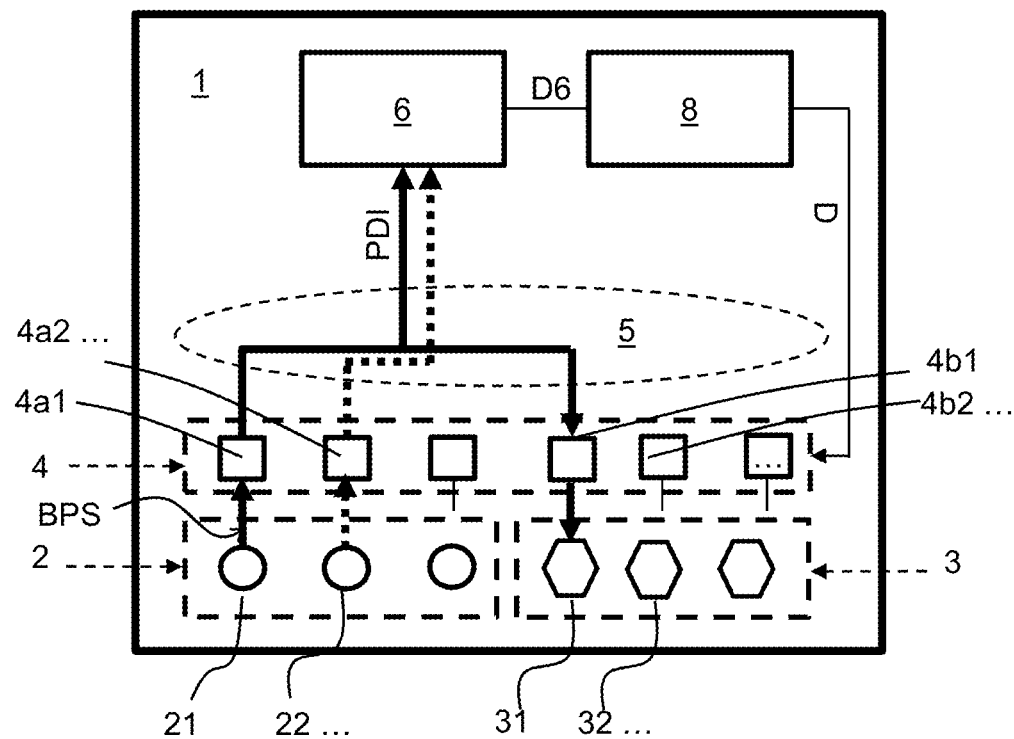

FIG. 3A, 3B, 3C illustrate a further embodiment of a brake system. Therein FIGS. 3A and 3B show subsequent stages in a normal operational mode (N) and FIG. 3C shows a degraded operational mode. In this embodiment, the brake actuator control unit 4b1 is configured to receive the primary deceleration intent signal PDI regardless whether the mode control unit 8 has selected the normal (N) or the degraded (D) operational mode. Instead the mode control unit 8 is configured to instruct the brake actuator control unit 4b1 to select by default the secondary deceleration intent signal SDI as the deceleration intent signal SDI and to instead select the primary deceleration intent signal PDI in the degraded operational mode (D).

Accordingly as shown in FIG. 3A for a first stage of the normal operational mode (N), the brake pedal control unit 4a1 responds to a brake pedal signal BPS by sending a primary deceleration intent signal PDI, which is received by the VCU 6 as well as by the brake actuator control unit 4b1. By default, the brake actuator control unit 4b1 ignores the primary deceleration intent signal PDI. In a second stage of the normal operational mode (N) shown in FIG. 3B, the VCU 6 has computed a secondary deceleration intent signal SDI, which is also received by the brake actuator control unit 4b1. In accordance with the selection of the mode control unit 8, it responds by activating the brake actuator 31 in accordance with this secondary deceleration intent signal SDI.

FIG. 3C shows operation of this embodiment in the degraded operational mode (D). In accordance with the selection of the mode control unit 8, it now responds by activating the brake actuator 31 in accordance with this primary deceleration intent signal PDI.

In the examples presented with reference to FIG. 3A, 3B, 3C it is presumed that the mode control unit 8 selects the operational mode in response to an auto-diagnostic signal. In alternative examples the mode control unit 8 has a diagnostic module 81 to perform diagnostic tests to the VCU 6.

Figure 3D:
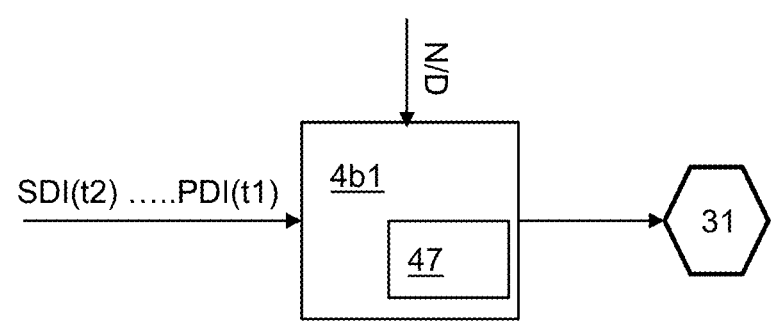
FIG. 3D schematically shows an embodiment of a brake actuator control unit.

FIG. 3D schematically shows a brake actuator control unit 4b1 that comprises a timer 47 to measure a time lapsed starting from a point in time t1 that a primary deceleration intent signal PDI is received. The brake actuator control unit 4b1 is configured to respond to the primary deceleration intent signal if it did not receive a secondary deceleration intent signal SDI from the central vehicle control unit VCU 6 in response to said primary deceleration intent signal if the measured lapse of time exceeds a threshold value. In one example the threshold value is 1 ms and the brake actuator control unit 4b1 responds by activating the brake actuator 31 in accordance with the primary deceleration intent signal PDI if it has not received the associated secondary deceleration intent signal SDI within a time interval of that duration starting from receipt of the primary deceleration intent signal PDI. In an embodiment the primary deceleration intent signal PDI is a message comprising a message identity indication and the secondary deceleration intent signal SDI generated by the central vehicle control unit VCU 6 refers to this message identity indication to facilitate the brake actuator control unit 4b1 to recognize a secondary deceleration intent signal SDI as being generated in response to a particular primary deceleration intent signal PDI. In the example shown in FIG. 3D the brake actuator control unit 4b1 receives the mode control signal N/D of the mode control unit 8. In that case, the brake actuator control unit 4b1 directly selects the primary deceleration intent signal PDI as the deceleration intent signal if the mode control unit 8 has selected the degraded operational mode. If the mode control unit 8 has selected the normal operational mode, it will by default select the secondary deceleration intent signal SDI. However, if the situation occurs that it does not receive an associated secondary deceleration intent signal SDI within a predetermined time interval starting with the receipt of a primary deceleration intent signal PDI, with selects said primary deceleration intent signal PDI as the deceleration intent signal for the purpose of controlling the actuator 31.

In another embodiment the brake actuator control unit 4b1 operates fully autonomously and does not require a control input from a mode control unit. In that embodiment it will respond as follows to a received primary deceleration intent signal PDI. It will start its timer 47. If it has received the secondary deceleration intent signal SDI associated with the primary deceleration intent signal PDI before expiry of the predetermined time interval it will control the actuator 31 in accordance with that secondary deceleration intent signal SDI. If it does not receive a secondary deceleration intent signal SDI associated with the primary deceleration intent signal PDI before expiry of the predetermined time interval it will control the actuator 31 in accordance with that primary deceleration intent signal PDI.

Figure 4:
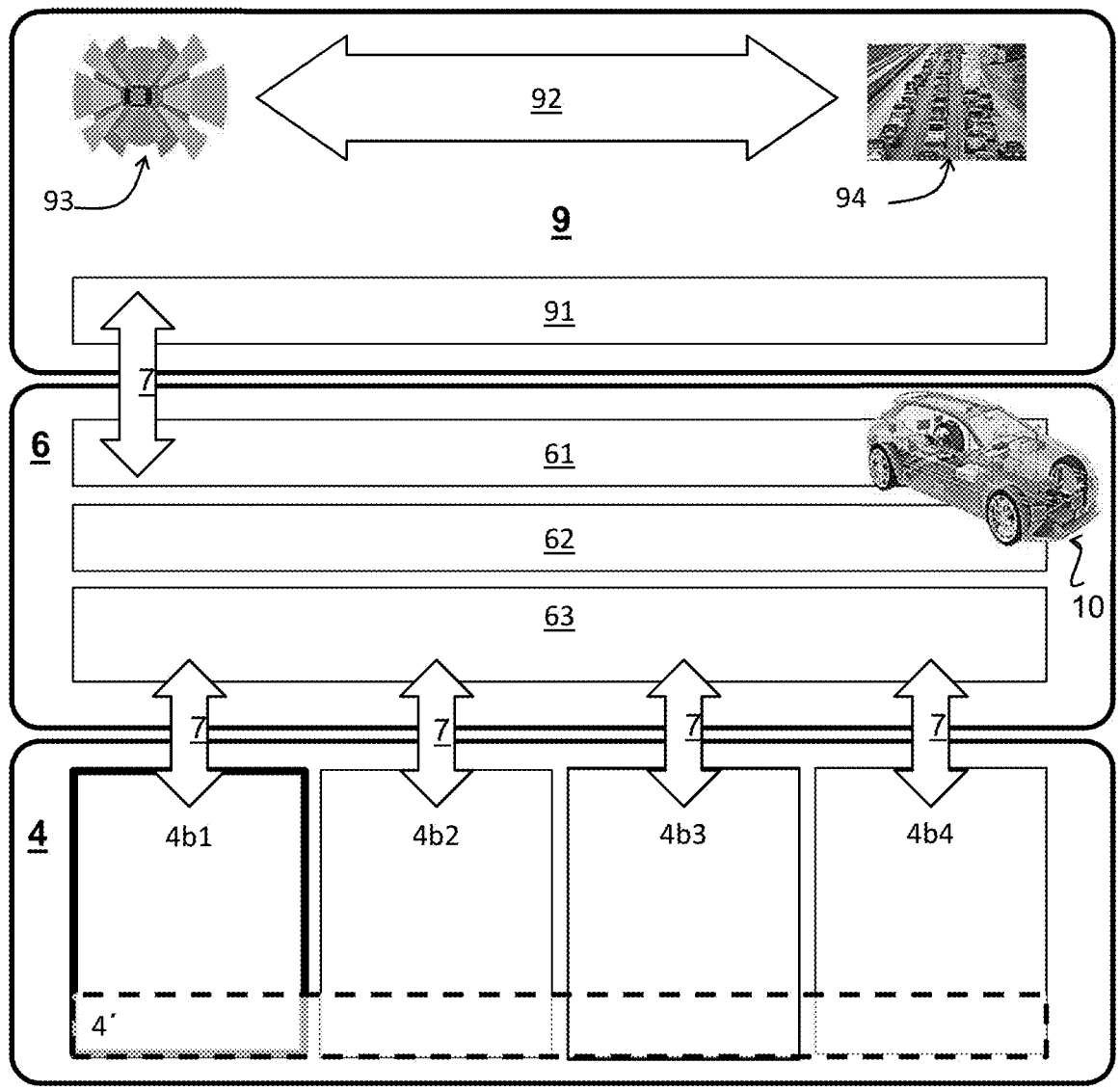
FIG. 4 shows an embodiment of a vehicle control system that comprises an embodiment of a brake system.

FIG. 4 shows an embodiment of a vehicle control system that comprises an embodiment of a brake system as disclosed herein. By way of example the vehicle control system shown in FIG. 4 comprises an example of the embodiment of the brake system in FIG. 1A. As schematically shown, the vehicle control system is incorporated into a vehicle 10 and it comprises additionally a vehicle movement control system unit 9 which comprises vehicle movement decision logic 91 to autonomously drive the vehicle 10. The vehicle movement decision logic 91 is configured to receive environment sensor signals from environment sensors 93, for example including Lidar, 3D-camera's and the like and traffic information signals from a traffic infra structure interface 94. The vehicle movement decision logic 91 is further configured to have access to big data computing resources 92. a vehicle movement control system unit 9 communicates via a network with the VCU 6. The VCU 6 shown as part of the vehicle control system in FIG. 4 amongst others has motion control functions 61, chassis level sensor signal processing functions 62, e.g. for control of Yaw, Steering angle, and the like and combined actuator control functions 63, such as ESP, ABS and the like. By way of example four smart actuators 4b1, 4b2, 4b3 and 4b4 are shown. These smart actuators include the combination of an actuator and their associated engine control unit ECU. In this example 4b1 is the combination of a brake actuator and its associated brake actuator control unit. A steering actuator and its associated steering actuator control unit are referred to with reference 4b2. Furthermore 4b3 and 4b4 respectively refer to a set of drive actuators and their proper control units, and to suspension actuators and associated control units.

Figure 5:
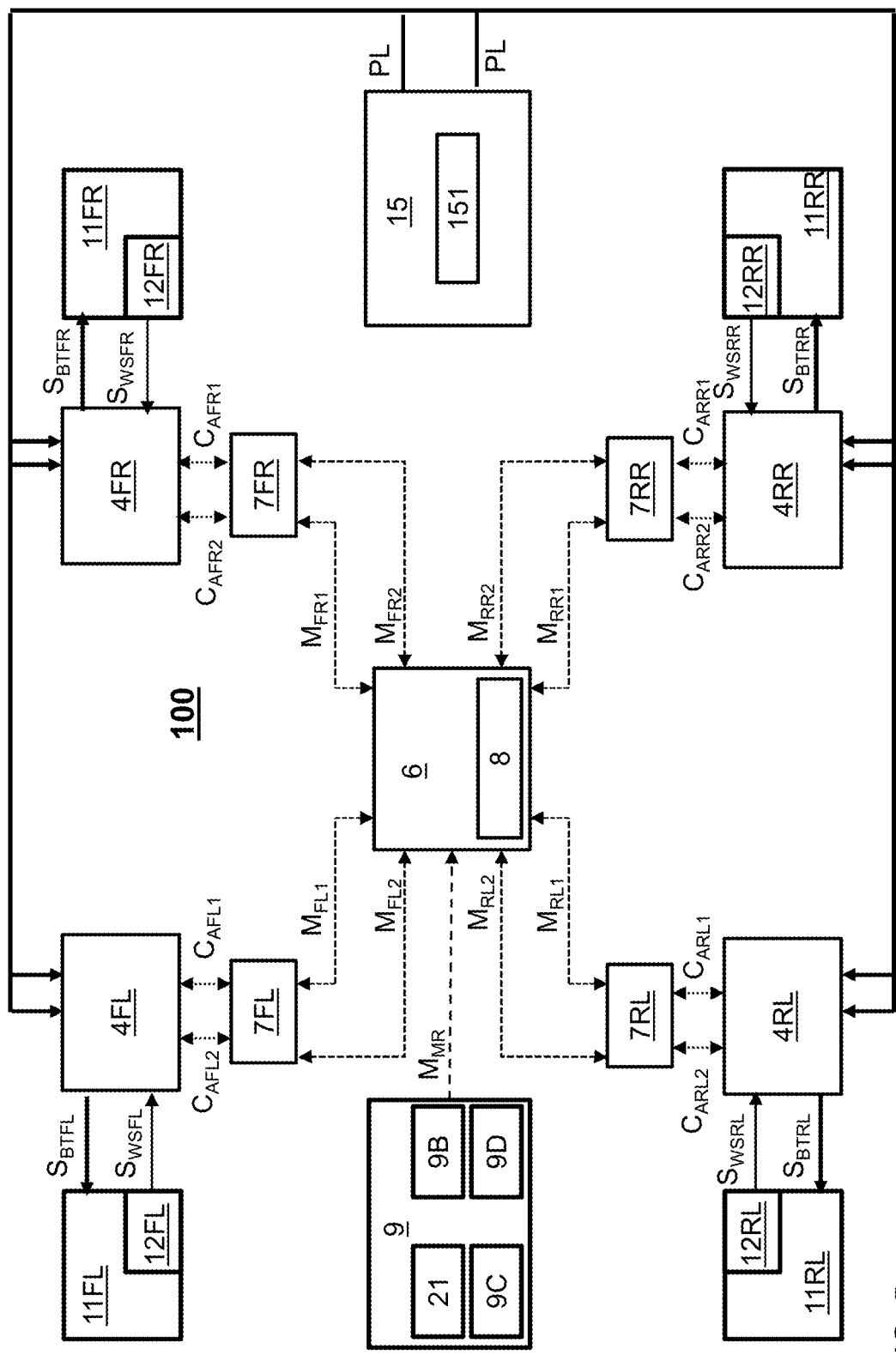
FIG. 5 shows aspects of the vehicle control system of FIG. 4 in more detail

FIG. 5 shows aspects of the vehicle control system of FIG. 4 in more detail. Therein it is schematically shown how respective smart brake actuators 4FL, 4FR, 4RL and 4RR act on respective wheels 11FL, 11FR, 11RL, 11RR of the car 10. Therein the suffixes FL, FR, RL, RR added to the reference numerals respectively indicate front left, front right, rear left, rear right. As shown each of the wheels 11FL, 11FR, 11RL, 11RR is provided with a proper wheel sensor 12FL, 12FR, 12RL, 12RR that provides a respective indication $S_{WSFL}$, $S_{WSFR}$, $S_{WSRL}$, $S_{WSRR}$ of the rotational velocity of the wheel. When braking the vehicle 10, the smart brake actuators 4FL, 4FR, 4RL and 4RR respectively act upon the wheels 11FL, 11FR, 11RL, 11RR by applying a braking torque $S_{BTFL}$, $S_{BTFR}$, $S_{BTRL}$, $S_{BTRR}$ in accordance with a deceleration indication signal. The procedure followed in a braking operation depends on an operational mode selected by the mode control unit 8. In the normal operational mode the braking torque is applied in accordance with a secondary deceleration indication signal that is computed by the VCU 6 in response to a primary deceleration indication signal that originates for example from a brake pedal sensor 21 or which is autonomously generated by the vehicle movement control system unit 9. The primary deceleration indication signal is conveyed by a message $M_{MR}$. A respective secondary deceleration indication signal is conveyed by the messages $M_{FL2}$, $M_{FR2}$, $M_{RL2}$ and $M_{RR2}$ to the smart brake actuators 4FL, 4FR, 4RL and 4RR. Instead, in the degraded operational mode the braking torque is applied in accordance with the primary deceleration indication signal, which is bypassed to the smart brake actuators with a message $M_{FL1}$, $M_{FR1}$, $M_{RL1}$ and $M_{RR1}$. In exemplary embodiments, the vehicle interface units 7FL, 7FR, 7RL and 7RR provide for a conversion of messages from a first message protocol to a second message protocol and reversely. The first message protocol is for example an Ethernet protocol for the messages exchanged with the VCU 6 or a bypass activated by the mode control unit 8 when the degraded operational mode is selected. The second message protocol is for example a CAN-protocol for communication with the smart actuators 4FL, 4FR, 7RL and 7RR. In the embodiment shown, the indications $S_{WSFL}$, $S_{WSFR}$, $S_{WSRL}$, $S_{WSRR}$ for the rotational velocity of the wheel provided by the wheel sensors 12FL, 12FR, 12RL, 12RR is conveyed as respective CAN protocol messages to the VCU to the vehicle interface units 7FL, 7FR, 7RL and 7RR and converted therein to an Ethernet message for the VCU 6, so that the VCU 6 can in a normal operational mode provide a secondary deceleration intent signal that takes into account this information. The vehicle movement control system unit 9 schematically shown in FIG. 5 further may comprise route planning functions 9B, road monitoring functions 9C and traffic information functions 9D. FIG. 5 further shows a vehicle power net 15 coupled to the smart actuators 4FL, 4FR, 7RL and 7RR with power lines PL, and having an energy source 151. For clarity, a power supply for the remaining elements is not shown in FIG. 5.

Figure 6A:
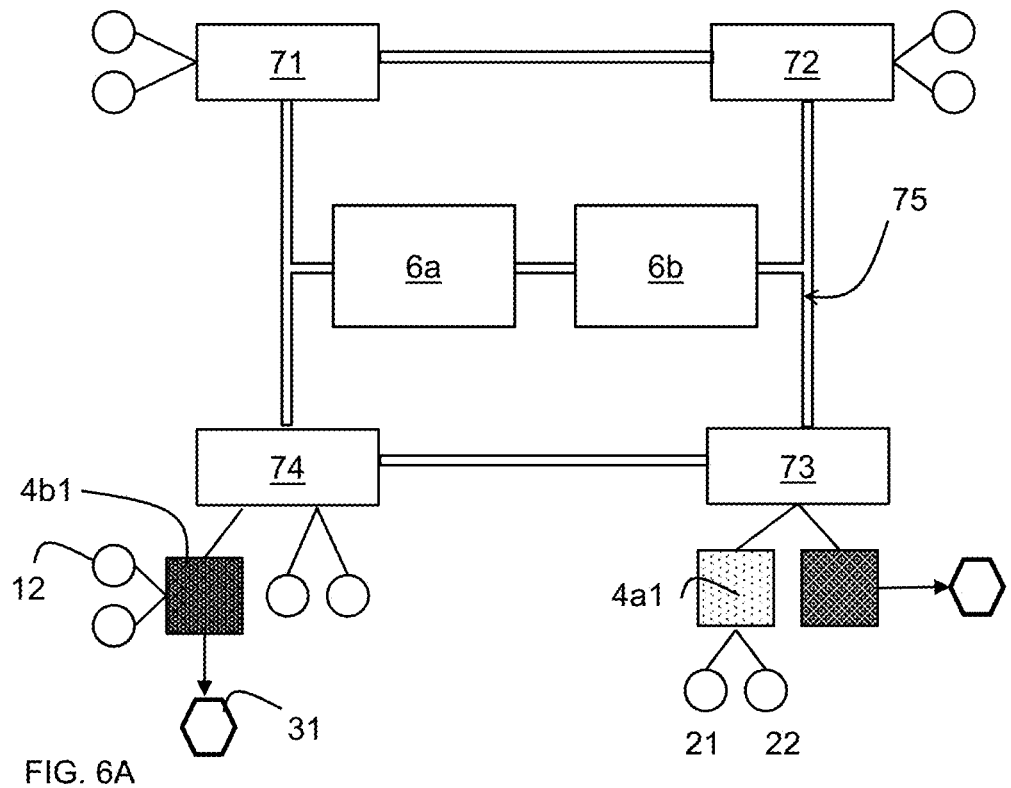
FIG. 6A, 6B show exemplary network topologies.
Figure 6B:
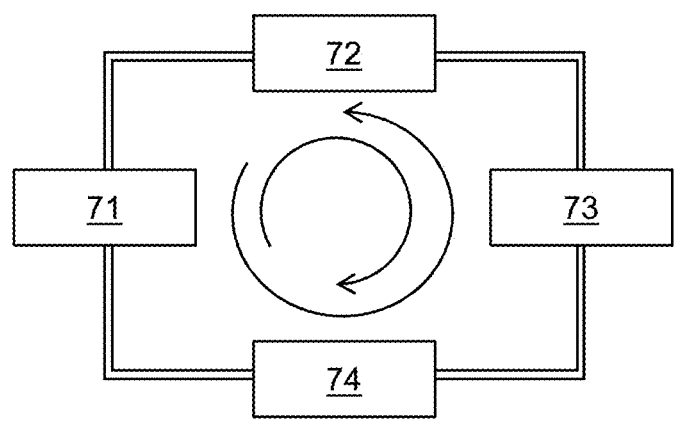

FIG. 6A, 6B show exemplary network topologies. In examples thereof, the vehicle level logic be hosted by high performance compute platforms (such as the chassis ECU, but could include AD ECU, Power Train ECU). The exemplary topology of FIG. 6A shows a pair of VCU's 6a, 6b. In one example, the VCU's operate in a redundant manner. Each computes the appropriate secondary intent signals, such as the secondary deceleration intent signals. Upon detecting a difference between the computed signals the mode control unit (not shown) provides for a transition of the normal operational mode to the degraded operational mode. Alternatively, the VCU's 6a, 6b may perform computations in a mutually complementary manner, and diagnose each other with a watchdog protocol. The VIUs 71, 72, 73, 74 mutually interconnected and connected to the VCU's 6a, 6b by Ethernet 75. The VIUs, also denoted as Gateways or Zone ECUs manage the sensor and actuator interfacing. By way of example VIU 73 has a CAN protocol interface with engine control unit 4a1 that is configured to receive input signals from pedal sensor 21 and another sensor 22. VIU 74 has a CAN protocol interface with engine control unit 4b1 that controls the brake actuator 31. In the example shown, the engine control unit 4b1 further receives sensor input, for example sensor input from wheel speed sensor 12.

FIG. 6B shows a dual ring topology which still allows distribution of the primary deceleration intent signal in the event of a failure of a network connection.

Figure 7:
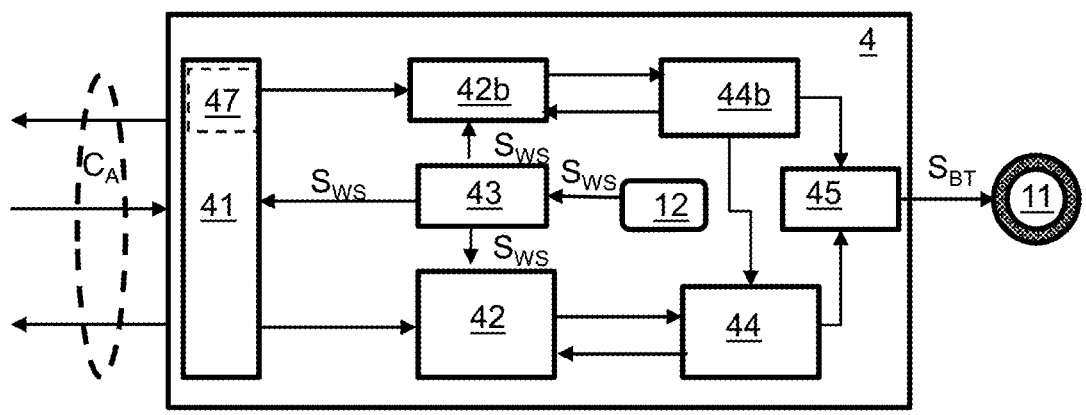
FIG. 7 shows an example of a smart actuator.

FIG. 7 shows an example of a smart actuator 4, for example to be incorporated as a smart actuator 4FL, 4FR, 7RL and 7RR in the system of FIG. 5. The smart actuator 4 has a CAN-bus interface 41, enabling it to communicate with other system elements, for example to receive a message conveying a secondary deceleration intent signal in the normal operational mode, a primary deceleration intent signal in the degraded operational mode, or to receive both. In an exemplary embodiments, the smart actuator 4 is configured to receive messages from a mode control unit (not shown) to determine whether it has to operate in response to a primary deceleration intent signal or to a secondary deceleration intent signal. In some embodiments, the smart actuator 4 has a timer (indicated by a dotted box 47) that enables the smart actuator 4 to decide autonomously to respond to a primary deceleration intent message, if it does not timely receive a corresponding secondary deceleration intent message. In some examples the smart actuator 4 has this functionality in combination with the functionality to selectively respond to one of a first and a secondary deceleration intent message. In that case, if the mode control unit has selected the degraded operational mode it will be responsive to the primary deceleration intent signal. By default in the normal operational mode it will be responsive to the secondary deceleration intent signal. However, if it does not timely receive a secondary deceleration intent signal corresponding to a primary deceleration intent signal, it will respond to that primary deceleration intent signal even if the normal operational mode is selected.

Figure 8:
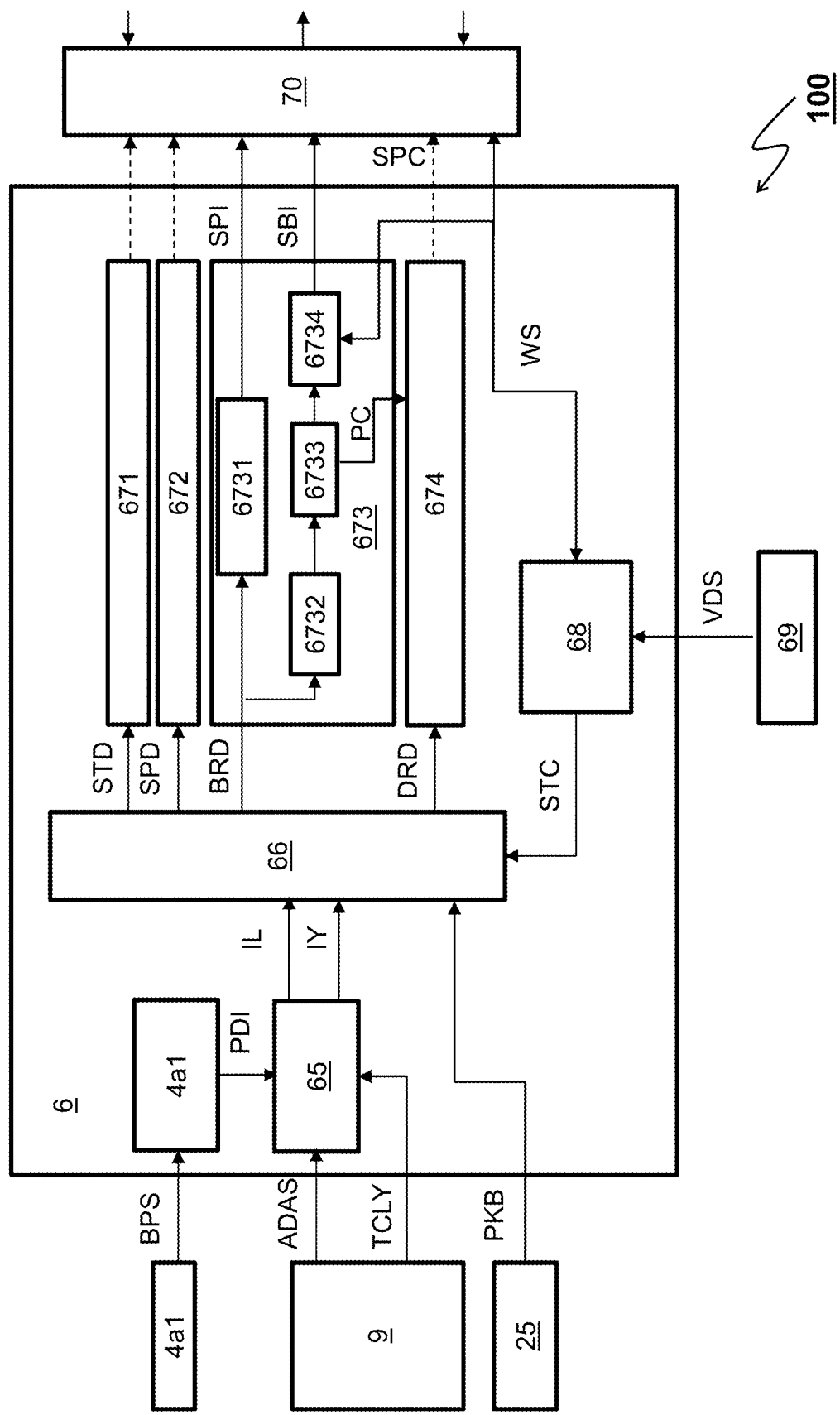
FIG. 8 shows in more detail a central vehicle control unit.

In response to the selected deceleration intent signal, it instructs a main driver control unit 42 to compute main actuator driver control signals to control actuator driver 44. In response thereto the actuator driver 44 generates the drive signals for actuator 45. The main driver control unit 42 further receives input signals $S_{WS}$ from wheel speed acquisition unit 43 coupled to wheel speed sensor 12. Therewith the main driver control unit 42 can autonomously adapt the main actuator driver control signals where necessary to avoid slippage. The CAN-bus interface 41 also transmits messages conveying the information indicative for the wheel speed as input for the VCU. The smart actuator 4 is provided with diagnostic means that allow a backup driver control unit 42b to drive a backup actuator driver 44b to drive the actuator 45 in case a failure is detected. FIG. 8 shows in more detail a VCU 6 which is coupled via a VIU 70 to the vehicle network and further coupled to receive inputs BPS from an ePedal 21, and to communicate with motion control system unit 9, for example to receive ADAS input signals and to receive trajectory control signals TCLY. For clarity only some of its inputs are shown, one further example is an input from a Park Button/ADAS 25. Input arbitration module 65 receives a primary deceleration intent signal PDI from brake pedal control unit 4a1 in response to the input BPS and the received ADAS input signals and trajectory control signals. In response thereto it provides intermediary longitudinal and yaw control signals IL, IY to control distribution and allocation module 66. In response thereto it issues a steering demand signal STD to a steering control module 671, a suspension demand SPD to a suspension control module 672, brake demand BRD to brake control module 673 and a drive demand DRD to powertrain control module 674. of either of the preceding claims at least one of a steering control system and a engine control system. In this example the brake control module 673 is shown in more detail. Therein a standstill management component 6731 is provided to compute a secondary parking intent signal SPI, generated in response to the park button 25. In case a deceleration intent is indicated by the brake demand BRD, a brake distribution component 6732 computes a proper distribution of the braking power to be applied to each of the wheels. A recuperation component 6733 then computes to which extent the braking demand BRD can be serviced by regenerative braking and appropriately provides a control signal PC to powertrain control module 674 to compute a powertrain control signal SPC to cause the powertrain control unit 4b3 (FIG. 4) to apply generative braking to that extent. The service control and ABS unit 6734 then generates a respective secondary deceleration intent signal SBI. For that purpose it also receives the wheel speed indication signals WS received via the vehicle network interface 70 to apply ABS if necessary. The wheel speed indication signals WS are also supplied to a stability control module 68 which further receives vehicle dynamic state signals VDS from chassis sensors 69. Based on the received signals WS and VDS, the stability control module 68 provides a further control signal to the input arbitration module 65. In response thereto, the input arbitration module 65 appropriately adapts the demand signals to the STD, SPD, BRD and DRD to the respective control modules to provide for optimal vehicle stability.

For the purpose of clarity and a concise description, features are described herein as part of the same or separate embodiments, however, it will be appreciated that the scope of the invention may include embodiments having combinations of all or some of the features described. For example, while embodiments were shown for messaging protocols, also alternative ways may be envisaged by those skilled in the art having the benefit of the present disclosure for achieving a similar function and result. Components may be combined or split up into one or more alternative components. For example a brake actuator control unit may be combine with a vehicle interface unit. As another example a brake actuator control unit may be provided as a plurality of redundant brake actuator control unit elements at mutually distant locations of the vehicle. Communication between system elements may take place via wired connections, e.g. for electronic or optical communication. Alternatively or additionally wireless communication may be provided. The various elements of the embodiments as discussed and shown offer certain advantages, such as an improved vehicle stability, a faster response, a reduced computational load and the like. Of course, it is to be appreciated that any one of the above embodiments or processes may be combined with one or more other embodiments or processes to provide even further improvements in finding and matching designs and advantages. It is appreciated that this disclosure offers particular advantages to brake systems, and in general can be applied for any application in a vehicle.

In interpreting the appended claims, it should be understood that the word "comprising" does not exclude the presence of other elements or acts than those listed in a given claim; the word "a" or "an" preceding an element does not exclude the presence of a plurality of such elements; any reference signs in the claims do not limit their scope; several "means" may be represented by the same or different item(s) or implemented structure or function; any of the disclosed devices or portions thereof may be combined together or separated into further portions unless specifically stated otherwise. Where one claim refers to another claim, this may indicate synergetic advantage achieved by the combination of their respective features. But the mere fact that certain measures are recited in mutually different claims does not indicate that a combination of these measures cannot also be used to advantage. The present embodiments may thus include all working combinations of the claims wherein each claim can in principle refer to any preceding claim unless clearly excluded by context.

The invention claimed is:

1. A brake system for braking a vehicle, the brake system comprising
   a set of sensors configured to detect a respective state of the vehicle, wherein the sensors comprise a brake pedal sensor operably connected to a brake pedal and configured to send a brake pedal signal when the brake pedal is actuated;
   a set of actuators configured to operate a respective state of the vehicle, wherein the actuators comprise a brake actuator configured to apply braking to the vehicle when receiving a brake actuating signal;
   a set of engine control units operably connected to the sensors and actuators, and interconnected via a network, wherein the engine control units comprise:
   a brake pedal control unit configured to receive the brake pedal signal from the brake pedal sensor and to send a primary deceleration intent signal onto the network, and
   a brake actuator control unit configured to activate the brake actuator in response to a deceleration intent signal received from the network;
   a central vehicle control unit configured to receive, process, and send signals for centrally controlling the vehicle;
   a mode control unit to configure the brake system in an operational mode selected from at least a normal operational mode and a degraded operational mode;
   wherein in the normal operational mode the brake actuator control unit is configured to activate the brake actuator in response to a secondary deceleration intent signal, the central vehicle control unit generating the secondary deceleration intent signal in response to the primary deceleration intent signal based on an overall state of the vehicle; and
   wherein in the degraded operational mode the brake actuator control unit is configured to activate the brake actuator in response to the primary deceleration intent signal for applying degraded (emergency) braking to the vehicle.

2. The brake system according to claim 1, wherein the mode control unit comprises a diagnostic module to perform a diagnosis of the central vehicle control unit and to select the degraded operational mode if it detects a malfunctioning of the central vehicle control unit.

3. The brake system according to claim 1, further comprising a set of vehicle interface units forming respective gateways in the network configured to route signals between the engine control units and the central vehicle control unit, wherein in the normal operational mode the mode control unit configures the vehicle interface units to route the primary deceleration intent signal from the brake pedal control unit to the central vehicle control unit and to route the secondary deceleration intent signal from the central vehicle control unit to the brake actuator control unit and wherein in the degraded operational mode, the mode control unit configures the vehicle interface units to route the primary deceleration intent signal from the brake pedal control unit to the brake actuator control unit.

4. The brake system according to claim 1, wherein the mode control unit is configured to instruct the brake actuator control unit to select by default the secondary deceleration intent signal as the deceleration intent signal and to instead select the primary deceleration intent signal in the degraded operational mode.

5. The brake system according to claim 4, wherein the brake actuator control unit comprises a timer to measure a time lapsed starting from a point in time that a primary deceleration intent signal is received and wherein the brake actuator control unit is configured to respond to the primary deceleration intent signal if it did not receive a secondary deceleration intent signal from the central vehicle control unit in response to said primary deceleration intent signal if the measured lapse of time exceeds a threshold value.

6. The brake system according to claim 1, wherein the central vehicle control unit is configured to determine an overall state of the vehicle using signals received from one or more sensors in the set of sensors other than the brake pedal sensor.

7. The brake system according to claim 1, wherein the central vehicle control unit is configured to determine an overall state of the vehicle using input signals from control units other than the brake pedal control unit.

8. The brake system according to claim 1, wherein the central vehicle control unit is configured to send other signals to engine control units other than the brake actuator control unit based on the deceleration intent signal received from the brake pedal control unit, the engine control units other than the brake actuator control unit comprising one or more of a steering actuator control unit, a power train control unit and a suspension actuator control unit.

9. The brake system according to claim 8, wherein the engine control units other than the brake actuator control unit include a power train, and wherein the central vehicle control unit is configured to compute to which extent a braking demand resulting from a primary deceleration intent can be serviced by regenerative braking and to compute a powertrain control signal to cause the powertrain control unit to apply regenerative braking to that extent.

10. A vehicle control system comprising in addition to the brake system of claim 1 at least one of a steering control system elements and power train control system elements.

11. A vehicle comprising in addition to the vehicle control system of claim 10, a pair of rear wheels, a pair of front wheels, an engine to drive one or more of the rear wheels and the front wheels, wherein the brake actuator control unit is configured to activate the brake actuator in response to the deceleration intent signal received from the network to act onto one or more of the one or more of the rear wheels and the front wheels.

12. A method for braking a vehicle, the method comprising obtaining sense signals with a set of sensors to detect a respective state of the vehicle, wherein said obtaining sense signals comprises obtaining a brake pedal signal from a brake pedal sensor when a brake pedal operably connected thereto is actuated;

sending a primary deceleration intent signal into a network in response to the brake pedal signal;

activating a brake actuator based on a deceleration intent signal received from the network according to an operational mode selected from at least a normal operational mode and a degraded operational mode;

wherein in the normal operational mode the brake actuator is activated by a secondary deceleration intent signal for centrally controlled braking provided by a central vehicle control unit based on the primary deceleration signal, further taking into account an overall state of the vehicle;

wherein in the degraded operational mode, the brake actuator is activated by the primary deceleration intent signal for applying degraded (emergency) braking to the vehicle.

13. The method according to claim 12, comprising performing a diagnosis of the central vehicle control unit and selecting the degraded operational mode upon detecting a malfunctioning of the central vehicle control unit.

14. The method according to claim 12, in the normal operational mode comprising routing the primary deceleration intent signal to the central vehicle control unit and routing the secondary deceleration intent signal from the central vehicle control unit as the deceleration intent signal to activate the brake actuator and in the degraded operational mode comprising routing the primary deceleration intent signal as the deceleration intent signal to activate the brake actuator.

15. A brake actuator control unit for use in a brake system of a vehicle, the brake actuator control unit being configured to subsequently receive primary deceleration intent signals and respective associated secondary deceleration intent signals from a network, and to activate a brake actuator in response to a selected one of a primary deceleration intent signal and its respective associated secondary deceleration intent signal, the brake actuator control unit being configured to select a received primary deceleration intent signal after expiry of a predetermined time-interval starting from said received primary deceleration intent signal in which did not receive the therewith associated secondary deceleration intent signal.

16. The brake system according to claim 2, further comprising a set of vehicle interface units forming respective gateways in the network configured to route signals between the engine control units and the central vehicle control unit, wherein in the normal operational mode the mode control unit configures the vehicle interface units to route the primary deceleration intent signal from the brake pedal control unit to the central vehicle control unit and to route the secondary deceleration intent signal from the central vehicle control unit to the brake actuator control unit and wherein in the degraded operational mode, the mode control unit configures the vehicle interface units to route the primary deceleration intent signal from the brake pedal control unit to the brake actuator control unit.

17. The brake system according to claim 2, wherein the mode control unit is configured to instruct the brake actuator control unit to select by default the secondary deceleration intent signal as the deceleration intent signal and to instead select the primary deceleration intent signal in the degraded operational mode.

18. The brake system according to claim 17, wherein the brake actuator control unit comprises a timer to measure a time lapsed starting from a point in time that a primary deceleration intent signal is received and wherein the brake actuator control unit is configured to respond to the primary deceleration intent signal if it did not receive a secondary deceleration intent signal from the central vehicle control unit in response to said primary deceleration intent signal if the measured lapse of time exceeds a threshold value.

19. A vehicle control system comprising in addition to the brake system of claim 2 at least one of a steering control system elements and power train control system elements.

20. A vehicle comprising in addition to the vehicle control system of claim 19, a pair of rear wheels, a pair of front wheels, an engine to drive one or more of the rear wheels and the front wheels, wherein the brake actuator control unit is configured to activate the brake actuator in response to the deceleration intent signal received from the network to act onto one or more of the one or more of the rear wheels and the front wheels.

\* \* \* \* \*